United States Patent [19]

Hoffman

[11] 3,816,172

[45] June 11, 1974

[54] NONREDUCIBLE PARTIALLY CRYSTALLIZED CROSSOVER DIELECTRICS

[76] Inventor: Lewis Charles Hoffman, 34 S. Cliffe Dr., Wilmington, Del. 19809

[22] Filed: July 12, 1972

[21] Appl. No.: 270,958

Related U.S. Application Data

[63] Continuation-in-part of Ser. No. 86,985, Nov. 4, 1970, abandoned.

[52] U.S. Cl. .................. 117/212, 117/217, 117/219, 106/52, 252/63.2

[51] Int. Cl. .................. C23d 5/10

[58] Field of Search .......... 117/215, 70 C, 212, 217, 117/219, 223; 106/39 DV, 52, 48.47; 252/63, 63.2

[56] References Cited

UNITED STATES PATENTS

| | | | |
|---|---|---|---|
| 2,920,971 | 1/1960 | Stookey | 106/39 DV |
| 3,113,877 | 12/1963 | Janakirama-Rao | 106/52 |
| 3,157,522 | 11/1964 | Stookey | 106/52 |
| 3,195,030 | 7/1965 | Herzog et al. | 106/39 DV |
| 3,294,557 | 12/1966 | Lajarte | 252/63.2 |
| 3,440,182 | 4/1969 | Hoffman | 106/48 |
| 3,464,836 | 9/1969 | Pendleton et al. | 106/52 |
| 3,560,256 | 2/1971 | Abrams | 117/215 |
| 3,615,949 | 10/1971 | Hicks | 117/217 |
| 3,649,353 | 3/1972 | Ulrich | 117/217 |

*Primary Examiner*—Douglas J. Drummond
*Assistant Examiner*—J. Massie
*Attorney, Agent, or Firm*—James A. Forstner

[57] ABSTRACT

Nonreducible partially crystallized crossover dielectrics in electronic devices consisting essentially of certain glasses which have been fired and comprise crystals dispersed in a glassy matrix.

6 Claims, No Drawings

NONREDUCIBLE PARTIALLY CRYSTALLIZED CROSSOVER DIELECTRICS

CROSS-REFERENCE TO RELATED APPLICATION

This application is a continuation-in-part of my copending application Ser. No. 86,985, filed Nov. 4, 1970, now abandoned.

BACKGROUND OF THE INVENTION

This invention relates to printed circuits, and more particularly to novel glasses for producing crossover dielectrics for use in such circuits.

It is useful in fabricating printed circuits to be able to conserve space by disposing a metallization directly above other metallizations. Of course, to prevent shorting and capacitance coupling, such metallizations must be separated by dielectric material.

There are two ways to produce such multilayer structures. The first consists of printing and firing "crossover" layers between printed conductor layers on a single substrate layer, to form what is sometimes called a "multilevel" printed wiring board. The second method involves printing conductor patterns on organic-bonded thin "tapes" of particulate alumina, then laminating such printed tapes and firing the resultant laminated structure at high temperature to make a discrete monolithic multilayer structure which serves as its own substrate. The present invention describes the role of certain glasses in the "multilevel" type of process, wherein the substrate is a prefired ceramic, usually alumina.

In the present invention the glasses which may be employed to print dielectric crossovers are partially crystallizable. Partially crystallizable dielectrics afford the hybrid circuit manufacturer a new and uniquely useful processing parameter. In the initial stages of firing, the dielectric behaves as if it were a single-phase glass, going through the normal processes of sintering, softening and coalesing. As the initial period of firing is completed, however, crystals appear and cause a large increase in viscosity. In subsequent firing, there is little or no development of thermoplasticity, allowing overprinted metallizing or insulating layers to behave as if they were supported by a ceramic substrate instead of by a thermoplastic glass.

Copending application Ser. No. 717,430, filed Mar. 29, 1968, now U.S. Pat. 3,586,522, discloses a composition useful in forming crossover dielectrics. Those compositions upon being fired are partially crystallized to hexacelsian ($BaAl_2Si_2O_8$), with resulting increase in crossover viscosity. The fired composition is a dispersion of such fine crystalline particles in a glassy matrix. However, the composition employed to make the crossovers of U.S. Pat. No. 3,586,522 contains a considerable quantity of lead oxide. Lead oxide there serves the purpose of a flux, reducing the melt viscosity of the fired crossover, so as to fit the low temperature firing requirements of a thick film process.

The present invention relates to the development of crossover dielectrics for use in multilevel circuitry in the situation where the structures are to be exposed to reducing atmospheres, such as forming gas, at elevated temperatures. It is often necessary to expose structures to such conditions in attaching devices to the substrate by brazing, in which case the device is protected from oxidation by the presence of a reducing gas (hydrogen)

blanket. Hydrogen and high temperatures reduce at least part of heavy metal oxides (such as lead oxide), if present in crossover dielectrics, to the metallic state, yielding a conductive surface and significant discoloration, both of which are deleterious to crossover properties.

Typical of prior art patents relating to massive or bulk articles of glass ceramics are Stookey U.S. Pat. No. 3,157,522 and Janakerama-Rao U.S. Pat. No. 3,113,877. This art relating to production of bulk articles of glass ceramics from bulk objects of glass is to be distinguished from the finely divided glasses used in the present invention to produce thin partially crystallized glass layers. The finely divided glasses used in the present invention are not exceedingly process-sensitive (time and temperature of firing) as are the prior art massive objects since nucleation (to produce crystals) readily occurs in the finely divided glasses of the present invention, whereas nucleation conditions in massive objects must be carefully controlled. The amount of crystallization in the finely divided glasses of the present invention is therefore, principally, composition dependent, that is, crystal formation is dependent upon what crystal formers are present.

SUMMARY OF THE INVENTION

This invention provides partially crystallizable glasses useful in producing nonreducible (hydrogen-stable) crossover dielectrics in printed circuits. The glasses are produced from a batch consisting essentially of the components set forth in Table I. The oxide components may be supplied to the melt as such, or as thermally decomposable precursors of the oxide(s).

TABLE I

Glass Melt Composition

| Component | Weight % Operative | Weight % Preferred |
|---|---|---|
| $SiO_2$ | 27–57 | 27–54 |
| $Al_2O_3$ | 5–20 | 5–18 |
| BaO | 7–20 | 8–16 |
| $TiO_2$ | 2–13 | 3–12 |
| ZnO | 4–37 | 5–36 |
| $B_2O_3$ | 0–18 | 3–17 |
| $Na_2SiF_6$ | 0–7 | 3–6 |
| $K_2O$ | 0–5 | 0–4 |
| CdO | 0–5 | 2–4 |

The glasses in finely divided form may be printed (usually screen printed) onto a substrate either dry or as a dispersion in an inert vehicle. In the dispersion generally there are 0.4 to 9 parts of glass per part of vehicle (by weight). When the glasses of the present invention are fired onto a substrate bearing a conductor pattern, a dielectric containing about 15–40 percent, preferably 20–40 percent, by weight of a crystalline phase dispersed in a glassy matrix is obtained. The dielectric is printed in at least one area where conductor patterns will cross over one another, after which the top conductor pattern is printed over the dielectric at such a crossover point.

The present invention fulfills need for crossover dielectrics which can be fired in reducing atmospheres, and additionally are characterized by hermeticity, surface smoothness, adhesion to conductors, solderability of conductors on top of the crossover dielectric, and good electrical properties. Further, the crossover dielectrics of the present invention minimize interconductor capacitance coupling and also are useful in making low loss capacitors. The crossover dielectrics of the present invention exhibit a lack of thermoplasticity, which inhibits overprint movement upon refiring.

The glasses of the present invention are obtained by quenching from the molten state a mixture of batch components which form the claimed materials in the prescribed proportions. The glass composition of the present invention, after it is quenched from the molten state, is then finely ground prior to being printed onto the substrate and fired as a film. The nucleation and crystallization of the glass composition to form a partially crystallized dielectric crossover is carried out in a single step.

DETAILED DESCRIPTION

The glasses of this invention exploit various ingredients in a critical combination of proportions such that they possess highly desirable properties. The ingredients of the novel glasses must be present within the composition ranges (expressed in weight percentages) prescribed in Table I.

A physical mixture of the glass ingredients (or precursors thereof) form stable glasses when quenched from the molten state, which stable glasses are the glasses of the present invention. In making the glasses of the present invention, there are employed certain critical proportions of glass formers and optionally $Na_2SiF_6$, but no lead oxide. When the glasses have been finely ground, printed and fired on substrates, the nucleation and partial crystallization of the glass are carried out in a single step, at the same firing temperature and, consequently, much more rapidly than with conventional crystallizing glasses. Once the glass softens and is held at the firing temperature for a sufficient period of time to crystallize, it becomes less thermoplastic.

The partially crystallized glass in the fired dielectric of the present invention contains a crystalline phase comprising up to 40 percent by weight of the total glass and crystals. As determined by X-ray diffraction, the crystals formed on firing are gahnite ($ZnAl_2O_4$), barium titanate ($BaTiO_3$), and sodium pentaborate ($Na_2B_{10}O_{17}$), the latter when optional $B_2O_3$ and $Na_2SiF_6$ are present in the glass-forming batch. It is thought that the crystalline phase often comprises comparable amounts of each of these three types of crystals, but, of course, the relative amounts of each of such crystals will depend upon the relative proportions of the respective crystal formers in the glass frit. The function of the above types of crystals is to provide an increase in viscosity upon first firing, so as to convert the printed crossover layer from a thermoplastic to a more thermosetting layer. It is thought that these crystals are not low expansion phases and, hence, do not provide a high degree of internal tempering forces.

The constituents of the glasses of this invention are chosen and combined in such a way as to produce a partially crystallized dielectric crossover which remains unaffected by the presence of hydrogen up to at least 1,000°C. (during brazing operations). Constituents must, therefore, have low reduction potential. This means that the glasses must be free of heavy metals. Zinc, aluminum, boron, barium and titanium (and optional sodium, where present) are all present in the crystal phases after maturation by firing. The only components of the unfired glasses not involved in fired crystalline phases are, therefore, the silica and optional $(SiF_6)^{2-}$. This means that the complex crystals mentioned above are dispersed in a very simple binder after maturation by firing. Titanium dioxide is, therefore, not only a crystallization catalyst, but also a part of the crystalline phase.

The proportions of the constituents in the unfired glasses of the present invention, and, therefore, in the fired partially crystallized crossover dielectrics of the present invention, are as follows. Silicon dioxide determines the softening characteristics, thermal expansion and chemical durability of the fired partially crystallized dielectric. The glasses contain 27–57 percent by weight silica. There is a definite preference for higher levels of silica content within this range; the preferred silica range is 45–57 percent.

Alumina is a constituent of one of the primary crystal phases which is produced upon firing. Alumina is present as 5–20 percent of the glass. Barium oxide is an essential constituent in the crystal phases produced and is present as 7–20 percent of the glass. The preferred amount of barium oxide is about 12–14 percent of the glass.

Titanium dioxide is the crystallization catalyst and is also a constituent of one of the crystalline phases, barium titanate. Titanium dioxide is 2–13 percent of the glass.

Zinc oxide is an essential constituent in that it forms one of the crystalline phases produced on firing; 4–37 percent of the glass is zinc oxide.

Boric oxide is optionally present in the glass as a viscosity reducer. It is present in amounts of up to 18 percent of the glass. $Na_2SiF_6$ (up to 7 percent) is also an optional viscosity reducer, useful in replacing heavy metal cations which would normally be present in crossover dielectrics were nonreducible dielectrics not the object of the present invention. Potassium oxide and cadmium oxide are optional modifying components, each of which may be present in amounts of up to 5 percent in the glasses of the present invention.

It should be understood that there are other constituents which may be used in making the glasses of this invention, and, consequently, the partially crystallized crossover dielectrics of the present invention, and which do not introduce strong adverse effects, such as the alkaline earths, transition metal oxides and rare earth oxides.

The glasses of the present invention are prepared from suitable batch compositions of oxides (or oxide precursors) and $Na_2SiF_6$ by melting any suitable batch composition which yields the prescribed compounds in the prescribed proportions. Metal oxides form stable glasses when quenched from the molten state, to produce the glasses. A physical mixture of metal oxides or oxide precursors such as metal hydroxides or carbonates may be employed. The batch composition to be utilized in preparing the glasses is first mixed and then melted to yield a substantially homogeneous fluid glass. The temperature maintained during this melting step is not critical, but is usually within the range 1,100°–1,650°C., so that rapid homogenation of the melt can be obtained. A temperature of about 1,450°C. is preferred. After a homogeneous fluid glass is obtained, it is generally poured into water or other liquid to form a glass frit.

The glasses used in making crossover dielectrics of the present invention are in finely divided form. The glass frit above is, therefore, finely ground in a conventional ball mill prior to dispersion in vehicle (if any) and printing. Glass powders having an average particle size not exceeding 50 microns in diameter are generally suitable, but those having average particle sizes of 1–15 microns are distinctly preferred. Generally, no particles in this preferred particle size should exceed 44 microns, that is the particles should pass through a 325-mesh screen (U.S. standard sieve scale).

The glasses of the present invention are printed as a film onto metallized prefired ceramic dielectric substrates in the conventional manner. Generally, screen stenciling techniques are preferably employed. The metallizing composition is printed as a finely divided powder either dry or in the form of a dispersion in an inert liquid vehicle. Any inert liquid may be used as the vehicle. Water or any one of various organic liquids, with or without thickening and/or stabilizing agents and/or other common additives, may be used as the vehicle. Exemplary of the organic liquids which can be used are the aliphatic alcohols; esters of such alcohols, for example, the acetate and propionates; terpenes such as pine oil, $\alpha$- and $\beta$-terpineol and the like; solutions of resins such as the polymethacrylates of lower alcohols, or solutions of ethylcellulose, in solvents such as pine oil and the monobutyl ether of ethylene glycol monoacetate. The vehicle may contain or be composed of volatile liquids to promote fast setting after application to the substrate. Alternately, the vehicle may contain waxes, thermoplastic resins or like materials which are thermofluids, so that the dispersion may be applied at an elevated temperature to a relatively cold ceramic substrate, upon which the glass composition sets immediately.

The ratio of inert vehicle to solids in this invention may vary considerably and depends upon the manner in which the dispersion is to be applied and the kind of vehicle used. Generally, from 0.4 to 9 parts by weight of solids per part by weight of vehicle will be used to produce a dispersion of the desired consistency. Preferably, 2–4 parts of solids per part of vehicle will be used.

As indicated above, the crossover compositions of the present invention are printed onto prefired ceramic substrates (with prefired metallizations thereon) after which the printed substrate is refired to mature the glass of the present invention and so produce the partially crystallized crossover dielectrics referred to above. Generally, the printed substrate must be fired in the temperature range 620–1050°C. to mature the glass and form the dielectric. Preferably, the firing is conducted at 800°–900°C., and typically for a total of 10 minutes, 5 minutes being at peak temperature. This firing step is a very important process step in securing the partially crystallized crossover dielectric of the present invention. The firing temperature selected for a particular glass is a temperature where differential thermal analysis shows the maximum crystallization rate to occur. Conventional differential thermal analysis procedures and determinations are disclosed by W. J. Smothers, "Differential Thermal Analysis", Chemical Publishing, New York, 1958. It is important that the nucleation and crystallization be carried out in a single step, at the same firing temperature, to form a partially crystallized dielectric within a short period of time. Such a short period may be less than 10 minutes. As the firing is carried out, crystals form and grow until the dielectric film is opaque. By following this procedure, the products of this invention contain up to 40 percent (by weight) crystalline phase as fine particles dispersed throughout a glassy matrix. It is felt that the finely divided nature of the glasses of the present invention results in more rapid crystallization kinetics, because the process is surface nucleated.

Generally, in practicing the present invention, the batch mixtures given in Table II, or any other suitable batch compositions, may be employed to produce glasses such as those of Table III, which may then be ground (and optionally dispersed in vehicle) to produce screen-printable compositions. It is possible to depart somewhat from the specific examples tabulated, provided that the compositions so produced have constituents present within the weight percentages prescribed in Table I.

The present invention is illustrated by the following examples. In the examples and elsewhere in the specification, all parts, ratios, and percentages of materials or components are by weight.

EXAMPLES 1–8

The glasses of Table III were prepared as follows in frit form from the respective batch compositions (1–8) of Table II, from $Na_2SiF_6$ and either the oxides or precursors of the oxides such as carbonates or hydroxides. Specifically, silica, titania, zinc oxide and cadmium oxide were introduced as oxides. Alumina was introduced as aluminum hydroxide, $Al(OH)_3$; boric oxide as boric acid; barium oxide as barium carbonate; and potassium oxide as potassium carbonate.

The dry batch components were weighed out, thoroughly mixed and introduced into a kyanite (aluminum silicate) crucible. Crucible and contents were placed in an electric furnace at 1,450°C. until all gas evolution ceased and the contents were clear and transparent. Crucible and contents were removed from the furnace and the contents slowly poured into cold water. The frit formed by this process was placed in a ball mill jar equipped with the normal complement (50 volume percent) of grinding medium (ceramic balls) and the proper weight of water (about 8 to 30 percent by weight of the solids to be ground) and ground until less than 1 percent residue was retained on a 325-mesh sieve (U.S. standard mesh). Normally, it takes 16 hours for a 1,500-gram charge in a one-gallon ball mill with 120 cc. of water to be properly ground. The slurry was vacuum filtered on No. 1 Whatman paper; the solid product was dried at 105°C. for 16 hours; the dried cake was then micropulverized to break up the drying aggregates.

Each of the finely divided glasses 1 through 8 was dispersed in 8 percent ethylcellulose and 92 percent $\beta$-terpineol. Three parts by weight of glass were used per part of vehicle.

The respective dispersions of dielectric composition were then each printed as layers on prefired metallized 96 percent alumina ceramic substrates which had been metallized with a conductor of 15 parts platinum, 55 parts gold and 8 parts zinc borosilicate frit and then fired at 750°C. for 10 minutes. Metallizations were then printed over the dielectric compositions. The stability of each crossover dielectric toward hydrogen was tested by first firing the sample in air and then refiring in atmospheres of 85 percent nitrogen and 15 percent hydrogen at 800°C. for 30 minutes.

TABLE II

Batch Composition (Weight Percentages)

| Component | Example No. 1 | 2 | 3 | 4 | 5 | 6 | 7 | 8 |
|---|---|---|---|---|---|---|---|---|
| $SiO_2$ | 45.6 | 41.2 | 47.0 | 46.0 | 46.9 | 45.1 | 24.3 | 24.3 |
| $Al(OH)_3$ | 12.9 | 23.4 | 20.0 | 13.0 | 16.0 | 6.4 | 15.2 | 15.2 |
| $BaCO_3$ | 18.1 | 4.3 | 4.6 | 15.1 | 7.7 | 25.3 | — | — |
| $TiO_2$ | 14.2 | 17.6 | 17.9 | 16.5 | 19.0 | 14.0 | 9.3 | 9.3 |
| ZnO | 2.5 | 3.1 | 3.5 | 2.6 | 3.5 | 2.5 | 10.8 | 10.8 |
| $B(OH)_3$ | 4.2 | 5.7 | 4.4 | 4.3 | 4.3 | 4.2 | 32.4 | 25.2 |
| $Na_2SiF_6$ | 2.5 | 4.7 | 2.6 | 2.5 | 2.6 | 2.5 | — | 5.4 |
| $K_2CO_3$ | — | — | — | — | — | — | 6.2 | 6.2 |
| CdO | — | — | — | — | — | — | 1.8 | 3.6 |

TABLE III

Batch Composition (Expressed as oxides and $Na_2SiF_6$) (Weight Percent)

| Component | Example No. 1 | 2 | 3 | 4 | 5 | 6 | 7 | 8 |
|---|---|---|---|---|---|---|---|---|
| $SiO_2$ | 54 | 47.8 | 54 | 54 | 54 | 54 | 27 | 27 |
| $Al_2O_3$ | 10 | 17.8 | 15 | 10 | 12 | 5 | 11 | 11 |
| $B_2O_3$ | 12 | 2.8 | 3 | 10 | 5 | 17 | — | — |
| BaO | 13 | 15.9 | 16 | 15 | 17 | 13 | 8 | 8 |
| $TiO_2$ | 3 | 3.6 | 4 | 3 | 4 | 3 | 12 | 12 |
| ZnO | 5 | 6.6 | 5 | 5 | 5 | 5 | 36 | 28 |
| $Na_2SiF_6$ | 3 | 5.5 | 3 | 3 | 3 | 3 | — | 6 |
| $K_2O$ | — | — | — | — | — | — | 4 | 4 |
| CdO | — | — | — | — | — | — | 2 | 4 |

The dielectric layers were then tested for porosity by fluorescent dye penetrants by observation under ultraviolet light; they were also inspected for traces of darkening. No porosity or darkening was observed. Electrical resistance was measured with respect to each sample to make certain that no reduction occurred after exposure to hydrogen at elevated temperature. The resistivities in each case exceeded $10^{11}$ ohms per square.

I claim:

1. A multilayer electronic device comprising a substrate having conductor patterns printed thereon and a fired crossover dielectric layer between said conductor patterns at at least one point of crossover between said conductor patterns, said crossover dielectric layer being nonreducible and consisting essentially of about 15–40 percent by weight crystals in a glassy matrix, said crystals comprising gahnite and barium titanate, said crossover dielectric being produced from a finely divided glass frit which in turn was produced from a melt which is free of reducible heavy metal oxides such as PbO and consists essentially of the following oxide or fluoride components by weight percent, wherein the oxide components are present in the melt as such or as thermally decomposable precursors of said oxides, 27–57% $SiO_2$
5–20% $Al_2O_3$
7–20% BaO
2–13% $TiO_2$
4–37% ZnO
0–18% $B_2O_3$
0–7% $Na_2SiF_6$
0–5% $K_2O$
0–5% CdO 2. A device according to claim 1 wherein the glass melt comprises 45–57% $SiO_2$.

3. A device according to claim 1 having 20–40 percent crystals in the crossover dielectric layer.

4. A device according to claim 1 wherein said crystals additionally comprise sodium pentaborate and said glass melt consists essentially of, by weight percent, 27–57% $SiO_2$
5–20% $Al_2O_3$
7–20% BaO
2–13% $TiO_2$
4–37% ZnO
2–18% $B_2O_3$
1–7% $Na_2SiF_6$
0–5% $K_2O$
0–5% CdO 5. A device according to claim 4 having 20–40 percent crystals in the crossover dielectric layer.

6. A device according to claim 4 wherein the glass melt consists essentially of, by weight percent, 27–54% $SiO_2$
5–18% $Al_2O_3$
8–16% BaO
3–12% $TiO_2$
5–36% ZnO
3–17% $B_2O_3$
3–6% $Na_2SiF_6$
0–4% $K_2O$
2–4% CdO

* * * * *